UNITED STATES PATENT OFFICE.

EDWIN R. JUMP, OF NEWTON, MASSACHUSETTS.

WATERPROOFED MATERIAL AND METHOD OF WATERPROOFING.

1,256,324.      Specification of Letters Patent.      Patented Feb. 12, 1918.

No Drawing.      Application filed May 2, 1917. Serial No. 165,865.

*To all whom it may concern:*

Be it known that I, EDWIN R. JUMP, a citizen of the United States, and resident of Newton, in the county of Middlesex and State of Massachusetts, have invented new and useful Improvements in Waterproofed Materials and Methods of Waterproofing, of which the following is a specification.

This invention relates to waterproofing and more particularly to the waterproofing of building materials composed wholly or in part of calcined gypsum, either in the form of blocks or as a plaster or mortar, and when used either in modeling, molding or casting.

Materials of the character referred to comprising calcined gypsum either in pure form or, as is more common in practice, in more or less impure form, are composed either wholly of gypsum or partly of gypsum and partly of other components, such as sand. The gypsum component of such materials is fine grained and very porous. The porous character of the material renders it exceedingly hygroscopic and this characteristic is accentuated by the fine grained structure of the material which gives rise to a strong capillary attraction for moisture. This results in the tendency of such materials, well-known to builders and other users of the materials, to absorb and retain large quantities of water, thus rendering them objectionable for most types of buildings.

Many compositions and methods of waterproofing have been proposed but, while many of them have been satisfactory for waterproofing concrete and ordinary mortar and plaster, none of them has been satisfactory for waterproofing gypsum products. This I believe to be due to the fact that gypsum is essentially a crystalline product, the mass of material after setting comprising a net-work of elongate crystals interwoven together, the crystals being somewhat wider than they are thick and being much longer than they are wide. The setting of a gypsum product involves the interweaving of these crystals by virtue of which the mass of material is bound together. On the other hand concrete is not essentially a crystalline product but is composed of a mass of granules or particles, such as sand or gravel, held together by a cementitious preparation, such as cement or lime, which by hardening causes the granules to adhere firmly, the action being primarily a gluing or surface adhesion action and not that of crystallization. Due to this difference in structure, I believe, although whether or not to this difference, the gypsum products are exceedingly difficult to waterproof satisfactorily.

The cardinal object of my invention is to provide a waterproof material which is practically impervious to moisture and to provide a composition and method for producing the material in a simple manner and at a low cost. It is the particular object of the invention to provide a composition and method which are especially adapted adequately to waterproof gypsum blocks and other gypsum products.

In its preferred form my invention is as follows: A solution or emulsion of rosin soap consisting of 62 parts carbonate of soda, 327 parts rosin and enough water to make 1000 parts, all by weight, is completely saponified, and to this is preferably added four times the volume of water. This solution is then added to the mixture of calcined gypsum and other materials, or other mixture employed to produce building material of the character referred to, and thoroughly incorporated therein. To this admixture is then added a suitable salt, preferably a one-tenth normal solution of copper sulfate, after which the mass is again thoroughly mixed, shaped into blocks or otherwise applied, and allowed to set, the constituent parts preferably being proportioned as follows: 10 parts of one-fifth normal solution of rosin soap, 5 to 7½ parts of one-tenth normal solution of copper sulfate, 50 parts of calcined gypsum or the like, and enough water to make 100 parts. Blocks formed in this manner will show an absorption of moisture in saturated air of as low as a fraction of one per cent. and of the order of one or two per cent. when soaked in water.

While I have obtained superior results by applying the waterproofing ingredients in the above described manner I have also obtained good results by mixing the solutions of rosin soap and metallic base before applying them to the building mixture. This simplifies the process somewhat but I prefer to follow the first method, especially in manufacturing gypsum blocks. I believe the superior results obtained by the first method to be due to chemical reactions taking place within the admixture of calcined gypsum or the like. The addition of the rosin soap and the metallic base in dry precipitated form appears to be less effective than either of the above methods, although fairly good results may be obtained by mixing the salt ingredient in dry form with the dry calcined gypsum or the like and then adding the soap solution.

Instead of rosin other resins may be employed and in lieu of copper sulfate as the metallic base other salts may be substituted, with fair results. For example, any one of the following salts in the proportions indicated are suitable when used, with 10 parts of a one-fifth normal solution of rosin soap, 50 parts of plaster, and enough water to make 100 parts, viz., 10 parts of one-fifth normal solution of potassium alum or 15 parts of one-fifth normal solution sodium alum, or 10 parts of one-half normal solution of aluminium sulfate, or 10 parts of one-fifth normal solution of lead acetate or ferrous sulfate, or zinc sulfate, or nickel sulfate, or manganese sulfate, or magnesium sulfate, or barium chlorid, or ferric chlorid, etc. Moreover, instead of using rosin soap other soaps and particularly other resinous soaps may be employed, but I have found the use of rosin soap to be much preferable. Ingredients other than sodium carbonate, as for example sodium hydrate, potassium carbonate and potassium hydrate, may be employed in producing the soap.

The unprecedented results afforded by my invention I believe to be due in major part to the use of the resinous soap and in thoroughly saponified form, complete saponification being of the utmost importance. The most satisfactory manner of preparing the soap of which I am aware consists in first dissolving the sodium carbonate in hot water, then slowly adding the rosin in powdered form, and boiling the solution until the saponification is wholly completed, the soda and rosin preferably being proportioned according to their molecular weights so as to produce a normal solution. The solution is then preferably diluted to form a one-half, one-fifth or other suitable fraction of a normal solution as above described.

While the present invention is adapted to a diversity of uses it is particularly suitable for treating gypsum building blocks and other building material comprising calcined gypsum. These blocks are commonly employed in constructing the walls and partitions of buildings, usually being held together with mortar and frequently being covered with plaster. I have found that the herein disclosed treatment in no wise diminishes the capability of the mortar or plaster to adhere to the blocks. Moreover, there appears to be no change in the appearance or the compressional strength of blocks formed by my new process. I have also determined that the waterproofing qualities afforded by this process are permanent.

The principal chemical reaction I believe to be the precipitation of an insoluble rosin soap and the advantage of mixing the soap solution with the calcined gypsum, or the like, before adding the metallic salt I believe to be due to the fact that the precipitated rosin soap is more uniformly distributed and applied throughout the mass when the precipitation takes place within the mass upon the addition of the metallic salt, thereby more effectually forming a water-repellant coating throughout the entire surface of the particles making up the mass.

It is to be understood that the term insoluble is relative, that it has been loosely employed in the art, and that many soaps which are relatively quite soluble have been described as being insoluble. The precipitated rosin soap produced according to the present invention is practically wholly insoluble either in water or, under ordinary climatic conditions, in moist air, and this quality is stable and permanent.

I have found that the addition of a slight amount of acid, such as hydrochloric, nitric or acetic acid, which is preferably added to the soap solution, lessens the amount of salt required.

I claim:

1. An artificial stone comprising gypsum and an insoluble salt precipitated directly upon the surface of the particles of gypsum.

2. An artificial stone comprising gypsum and an insoluble soap precipitated directly upon the surface of the particles of gypsum from a completely saponified rosin soap.

3. The method of producing artificial stone comprising precipitating an insoluble salt on particles of material and joining the particles together in the form of a rigid body.

4. The method of producing a rigid waterproof body of particles comprising mixing together a mass of particles, at least a part of which are adapted to set, precipitating an insoluble salt directly on the particles throughout the mass, and causing the mass to set.

5. The method of producing a rigid waterproof body of particles comprising mixing together a mass of particles at least a part of which are adapted to set, a soluble salt and a precipitant, the salt and precipitant being adapted to produce an insoluble precipitate, whereby the insoluble precipitate is deposited over the surface of the individual particles of the mass, and causing the mass to set.

6. The method of producing artificial stone comprising mixing together a mass of particles, a soluble resinate, and a precipitant adapted to convert the resinate into an insoluble salt, thereby to precipitate the insoluble salt over the surface of the particles of the mass, and joining the particles together in the form of a rigid body.

7. The method of producing artificial stone comprising mixing together a mass of particles, a soluble resinate having no free resin, and a precipitant adapted to convert the resinate into an insoluble salt, thereby to precipitate the insoluble salt over the surface of the particles of the mass, and joining the particles together in the form of a rigid body.

8. The method of producing a rigid body of particles comprising mixing together a mass of particles of gypsum, a solution of soap, and a metallic salt, and causing the composition to set.

9. The method of producing a rigid body of particles comprising mixing together a mass of particles of gypsum, a soluble resinate, and a precipitant adapted to convert the soluble resinate into an insoluble salt, and causing the composition to set.

10. The method of producing a rigid body of particles comprising mixing together a mass of particles of gypsum, rosin soap, and a metallic salt, and causing the composition to set.

11. The method of producing a rigid body of particles comprising mixing together a mass of particles of gypsum, a solution of completely saponified rosin soap, and a metallic salt, and causing the composition to set.

12. The method of producing a rigid body of particles comprising mixing together a mass of particles of gypsum, adding a completely saponified soap, then adding a metallic salt, and causing the composition to set.

13. The method of producing waterproof artificial stone comprising mixing together a mass of particles, a resinate, and copper sulfate, thereby to precipitate an insoluble salt directly upon the surface of the particles, and forming the mass into a rigid body.

14. The method of producing waterproof artificial stone comprising mixing together a mass of particles and a salt solution, then adding a precipitant adapted to precipitate an insoluble salt from the salt solution upon the surface of the particles, and forming the mass into a rigid body.

15. The method of producing waterproof gypsum building material comprising mixing together a mass of gypsum particles and a salt solution adapted to yield an insoluble salt, adding a precipitant adapted to precipitate an insoluble salt from the solution upon the particles of gypsum, and causing the mass to set.

16. The method of producing artificial stone comprising precipitating an insoluble soap on particles of material and joining the particles together in the form of a rigid body.

17. An artificial stone comprising gypsum and an insoluble soap precipitated directly upon the surface of the particles of gypsum.

Signed by me at Boston, Massachusetts this 10th day of April, 1917.

EDWIN R. JUMP.